United States Patent [19]

Thomas

[11] Patent Number: 4,968,253

[45] Date of Patent: Nov. 6, 1990

[54] NAIL POLISH COLOR DISPLAY STAND

[76] Inventor: Peter C. Thomas, 6750 Riverside Boulevard, Sacramento, Calif. 95831

[21] Appl. No.: 308,671

[22] Filed: Feb. 10, 1989

[51] Int. Cl.[5] .................................................. G09B 19/00

[52] U.S. Cl. ........................................ 434/100; 132/73

[58] Field of Search .................. 132/73, 73.5, 75, 333; 434/98, 99, 100, 101, 102, 103, 104; 206/81, 581, 823; 40/1

[56] References Cited

U.S. PATENT DOCUMENTS

| | | | |
|---|---|---|---|
| 161,804 | 1/1851 | Walsh | D6/468 |
| 1,528,621 | 3/1925 | Lavers | 434/104 |
| 1,960,669 | 5/1934 | Freedman | 434/100 |
| 2,020,100 | 11/1935 | Boyd | 434/100 |
| 2,300,170 | 10/1942 | Pickard | 132/73 |
| 3,070,906 | 1/1963 | Tinsley | 434/100 |
| 3,102,637 | 9/1963 | Scholl | 211/69 |
| 3,485,344 | 12/1969 | Aylott | 206/45.14 |
| 4,106,614 | 8/1978 | Aylott | 132/73 |
| 4,140,139 | 2/1979 | Aylott | 132/73 |
| 4,561,850 | 12/1985 | Fabbri et al. | 434/100 |
| 4,744,378 | 5/1988 | Bostic | 132/320 |

FOREIGN PATENT DOCUMENTS

| | | | |
|---|---|---|---|
| 0023695 | 9/1962 | German Democratic Rep. | 434/98 |
| 1017199 | 1/1966 | United Kingdom | 132/73 |
| 1252075 | 11/1971 | United Kingdom | 132/73 |

*Primary Examiner*—John J. Wilson
*Assistant Examiner*—Frank A. LaViola, Jr.
*Attorney, Agent, or Firm*—Jerry T. Kearns

[57] ABSTRACT

A nail polish display stand is formed from a cylindrical housing having an open top end and a hollow interior defined by an interior side wall and an interior floor. A plurality of steps are formed in the interior side wall and form perpendicularly intersecting horizontal annular and vertical cylindrical surfaces. The steps increase in diameter from the interior floor to the open top end of the housing. A plurality of various different shades of nail polish color samples are displayed on the horizontal and/or vertical surfaces of the steps. The color samples may be individually provided on artificial nails secured on the steps. The nails may be mounted on a plurality of spaced arcuate mounting surfaces or may alternatively be secured within a plurality of pairs of spaced slots on the steps. The display stand allows an extremely large number of different color shades to be displayed in a small space.

13 Claims, 5 Drawing Sheets

NAIL POLISH COLOR DISPLAY STAND

BACKGROUND OF THE INVENTION

1. Field of the Invention

The present invention relates to display stands, and more particularly pertains to a display stand for nail polish color samples. The cosmetic industry has grown to a multi-billion dollar per year business. Increasing competition in the cosmetic industry among various manufacturers has resulted in a proliferation of the available color shades of nail polish. Conventionally, these polish shades are displayed in books, on charts or by aligning nail polish bottles in spaced relation on vertical racks. These various display methods consume a relatively large amount of space and are ineffective to display the large number of available shades in a small area. Additionally, it is cumbersome for a consumer to page through a sample book or to pour over a large chart in order to select a nail polish shade. Frequently, consumers sorting among nail polish bottles displayed in racks drop or damage one or more of the bottles. Additionally, the aforesaid displayed methods do not provide a realistic display of the nail polish, as it appears on a nail surface. In order to obtain a realistic indication of a particular nail polish shade, many customers will open a polish bottle and apply a small quantity to their own nails. This forces retailers to provide sample bottles or to incur expense due to the wastage of opened bottles. In order to overcome these problems, the present invention provides an improved nail polish color display stand which provides a realistic display of each nail polish shade on an artificial fingernail. The display stand of the present invention can display as many as two hundred thirty-six different nail polish shades within a small cylindrical housing having only a twelve inch diameter.

2. Description of the Prior Art

Various types of display stands are known in the prior art. A typical example of such a display stand is to be found in U.S. Design Patent 161,804, which issued to J. Walsh on Jan. 30, 1951. This patent discloses a lipstick display case for displaying a plurality of lipstick tubes on vertically ascending steps. U.S. Pat. No. 3,102,637, which issued to W. Scholl on Sept. 3, 1963, discloses a holder for dental burs which include a plurality of annular vertically extending steps. A plurality of spaced apertures are provided on a horizontal annular surface of each step for receiving the shank of an individual dental bur. U.S. Pat. No. 3,485,344, which issued to E. Aylott on Dec. 23, 1969, discloses a display container for artificial fingernails which includes an arcuate array of adjacent recesses provided in an interior floor portion of a hinged case. U.S. Pat. No. 4,140,139, which issued to E. Aylott on Feb. 20, 1979, discloses a package for mounting and displaying artificial fingernails which includes an array of increasing size artificial nails displayed in adjacent relation.

While the above mentioned devices are suited for their intended usage, none of these devices are capable of displaying an extremely large number of nail polish color shade samples within a very small area. Additionally, none of these devices include a cylindrical housing a hollow interior defined by an interior floor and an interior side wall forming a series of vertically ascending steps of increasing diameter. Inasmuch as the art is relatively crowded with respect to these various types of display stands, it can be appreciated that there is a continuing need for and interest in improvements to such display stands, and in this respect, the present invention addresses this need and interest.

SUMMARY OF THE INVENTION

In view of the foregoing disadvantages inherent in the known types of display stands now present in the prior art, the present invention provides an improved nail polish color display stand. As such, the general purpose of the present invention, which will be described subsequently in greater detail, is to provide a new and improved nail polish color display stand which has all the advantages of the prior art display stands and none of the disadvantages.

To attain this, representative embodiments of the concepts of the present invention are illustrated in the drawings and make use of a cylindrical housing having an open top end and a hollow interior defined by an interior side wall and an interior floor. A plurality of steps are formed in the interior side wall and form perpendicularly intersecting horizontal annular and vertical cylindrical surfaces. The steps increase in diameter from the interior floor to the open top end of the housing. A plurality of various different shades of nail polish color samples are displayed on the horizontal and or vertical surfaces of the steps. The color samples may be individually provided on artificial nails secured on the steps. The nails may be mounted on a plurality of spaced arcuate mounting surfaces or may alternatively be secured within a plurality of pairs of spaced slots on the steps. The display stand allows an extremely large number of different color shades to be displayed in a small space.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved nail polish color display stand which has all the advantages of the prior art display stands and none of the disadvantages.

It is another object of the present invention to provide a new and improved nail polish color display stand which may be easily and efficiently manufactured and marketed.

It is a further object of the present invention to provide a new and improved nail polish color display stand which is of a durable and reliable construction.

An even further object of the present invention is to provide a new and improved nail polish color display stand which is susceptible of a low cost of manufacture with regard to both materials and labor, and which accordingly is then susceptible of low prices of sale to the consuming public, thereby making such display stands economically available to the buying public.

Still yet another object of the present invention is to provide a new and improved nail polish color display stand which provides in the apparatuses and methods of the prior art some of the advantages thereof, while simultaneously overcoming some of the disadvantages normally associated therewith.

Still another object of the present invention is to provide a new and improved nail polish color display stand which allows an extremely large number of nail polish color shades to be displayed in a small area.

Yet another object of the present invention is to provide a new and improved nail polish color display stand which displays nail polish color samples in a realistic manner.

Even still another object of the present invention is to provide a new and improved nail polish color display stand which utilizes a cylindrical housing having a hollow interior with an interior side wall forming a series of vertically ascending, increasing diameter steps for displaying a large number of nail polish color shade sample in a small area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
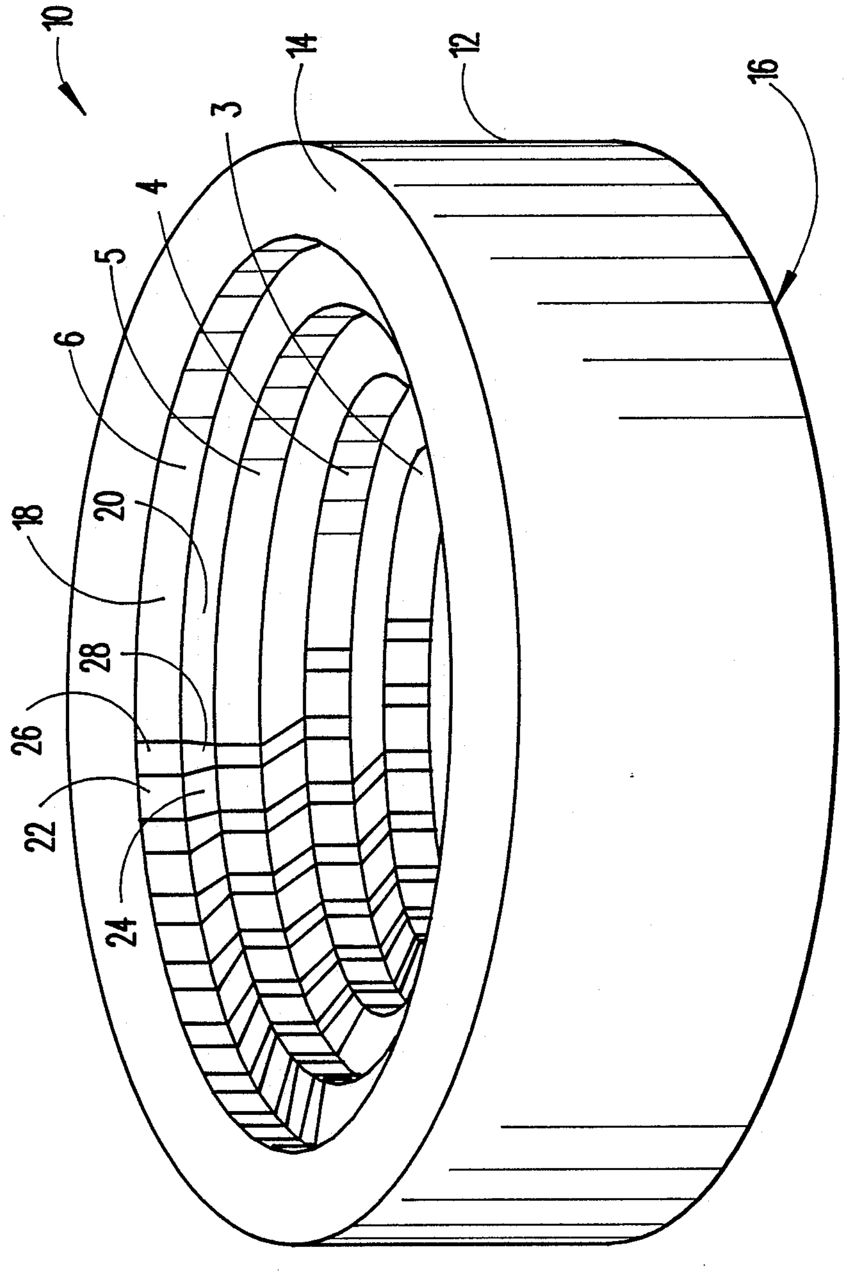
FIG. 1 is a perspective view illustrating a nail polish color display stand according to the present invention.

With reference now to the drawings, and in particular to FIG. 1 thereof, a new and improved nail polish color display stand embodying the principles and concepts of the present invention and generally designated by the reference numeral 10 will be described.

More specifically, it will be noted that the first embodiment 10 of the invention includes a cylindrical housing 12 having an open top end 14 and a hollow interior defined by a stepped interior side wall. A plurality of vertically ascending steps 3, 4, 5 and 6 are formed in the interior cylindrical side wall of the housing 12. Each of the steps includes a vertical cylindrical surface 18 and a perpendicularly intersecting horizontal annular surface 20. The vertical surface 18 includes a plurality of spaced zones 22 separated by smaller spacing zones 26. The horizontal annular surface 20 of each step includes a plurality of zones 24 separated by smaller spacing zones 28. As illustrated, the diameter of the vertical surfaces 18 and horizontal surfaces 20 increases upwardly from an interior floor of the housing 12. Thus, as each of the zones 22, 24, 26 and 28 are formed of equal size, the higher steps will have a larger number of zones. It is contemplated that each of the zones 22 or 24 may be provided with a different nail polish color shade sample. Alternatively, one of the vertical zones 22 may be provided with a color sample while the adjacent horizontal zone 24 will bear identifying indicia such as the shade number identifying the shade on the associated vertical zone 22. This arrangement may of course be reversed, and the horizontal zones 24 may bear the nail polish color shade sample and the associated vertical zone 22 will bear the identifying indicia for that shade. It should be noted that the present invention additionally contemplates the use of various different shaped housings, for example square, hexagonal, octagonal, etc. However, the illustrated cylindrical form is preferred, because this allows an extremely large number of nail polish color shade samples to be displayed in a small area. For example, if the cylindrical housing 12 has a diameter of about twelve inches, as many as two hundred and thirty-six different shades of nail polish may be displayed therein. The housing 12 has a planar bottom surface 16 which is adapted to be supported on a horizontal surface such as a counter top at a retail store. Alternatively, the display stand 10 may be mounted with the planar bottom surface 16 in abutment with a vertical wall surface.

Figure 2:
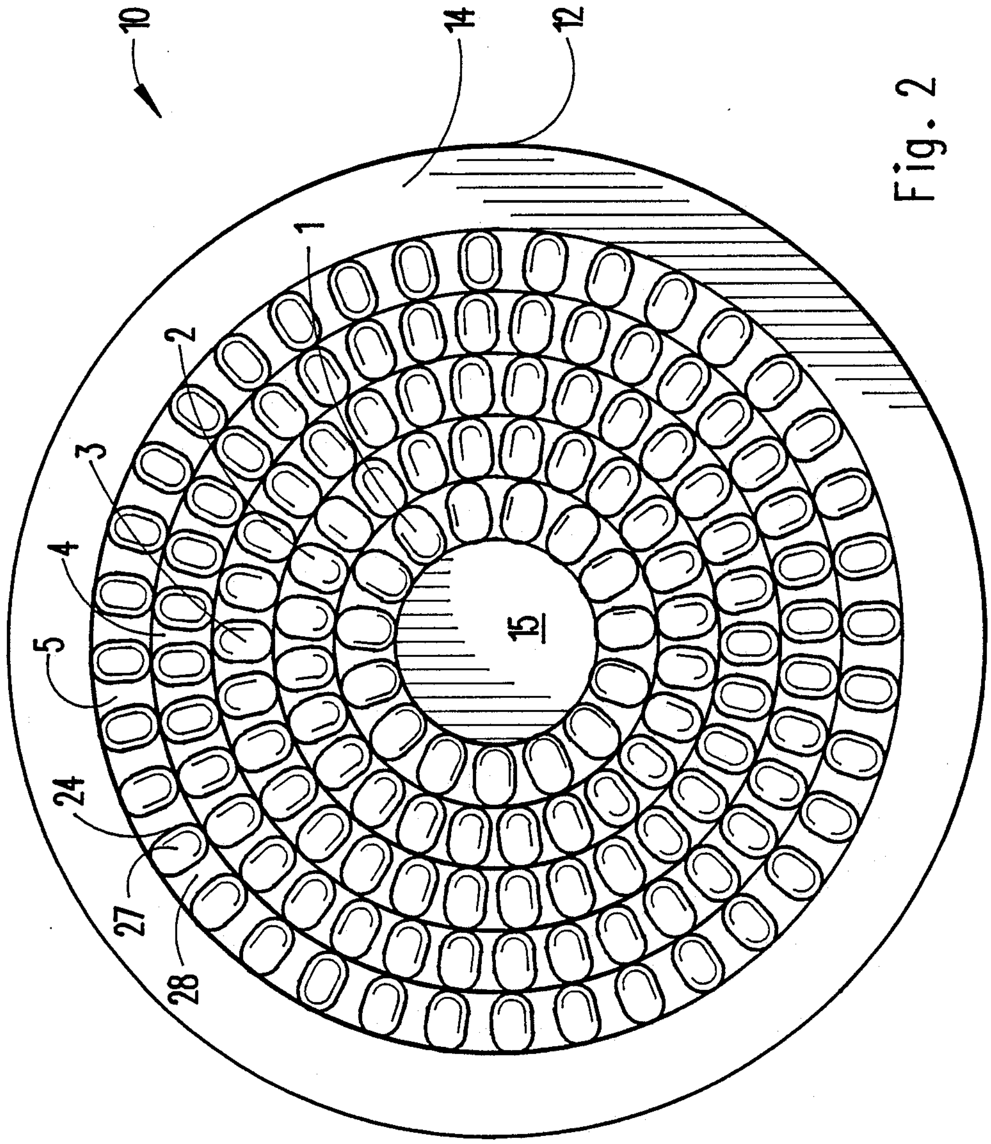
FIG. 2 illustrates a top plan view of a nail polish display stand according to the present invention.

FIG. 2 illustrates a top plan view which illustrates a display stand 10 having five steps 1, 2, 3, 4 and 5 ascending vertically from an interior floor 15. It should be noted that by increasing the height of the cylindrical housing 12, an increasing number of steps may be provided, thus increasing the number of shades displayed. The spacings, dimensions, and size of the nail polish samples and steps may be selected as desired, without departing from the scope of the present invention. In order to provide a realistic display of a nail polish color sample, the horizontal zones 24 may include an artificial nail 27. Each of the nails 27 is separated from each adjacent nail by the spacing zone 28. The artificial nail 27 may be integrally molded on the horizontal step surface, or may be secured thereto, for example adhesively. The artificial nail 27 preferably has an arcuate curvature to accurately simulate the appearance of a polish sample on an individual's fingernail.

Figure 3:
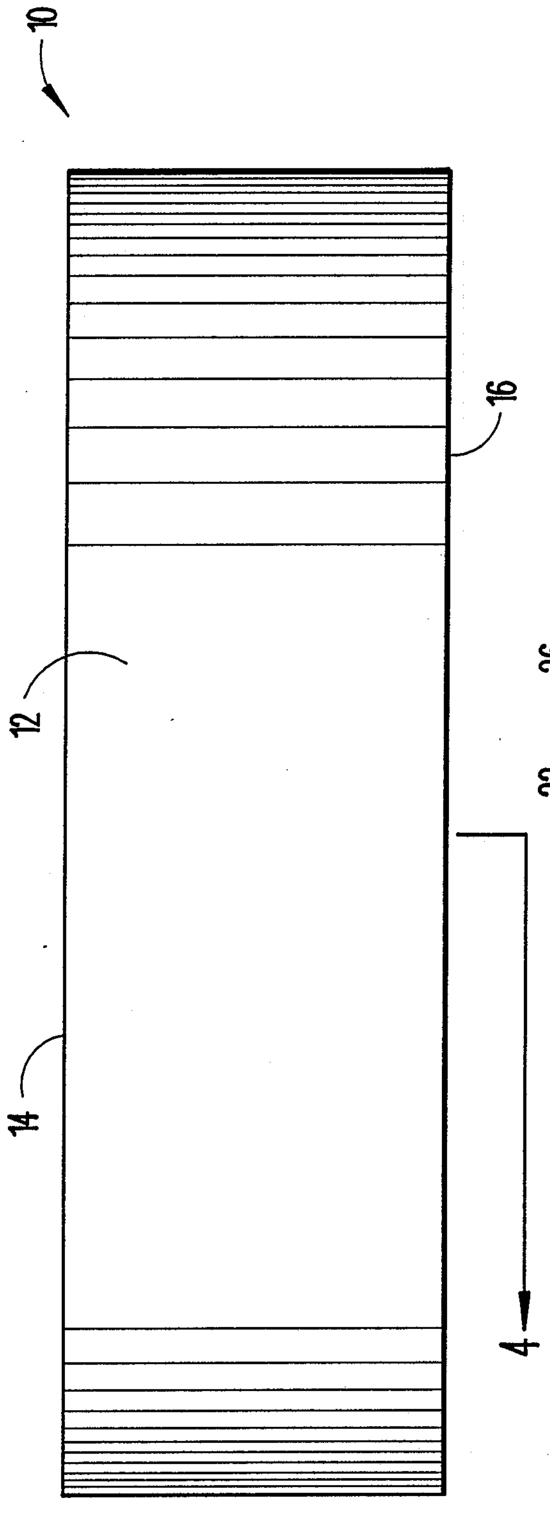
FIG. 3 illustrates a side view of a nail polish display stand according to the present invention.

FIG. 3 illustrates a side view of the cylindrical housing 12.

Figure 4:
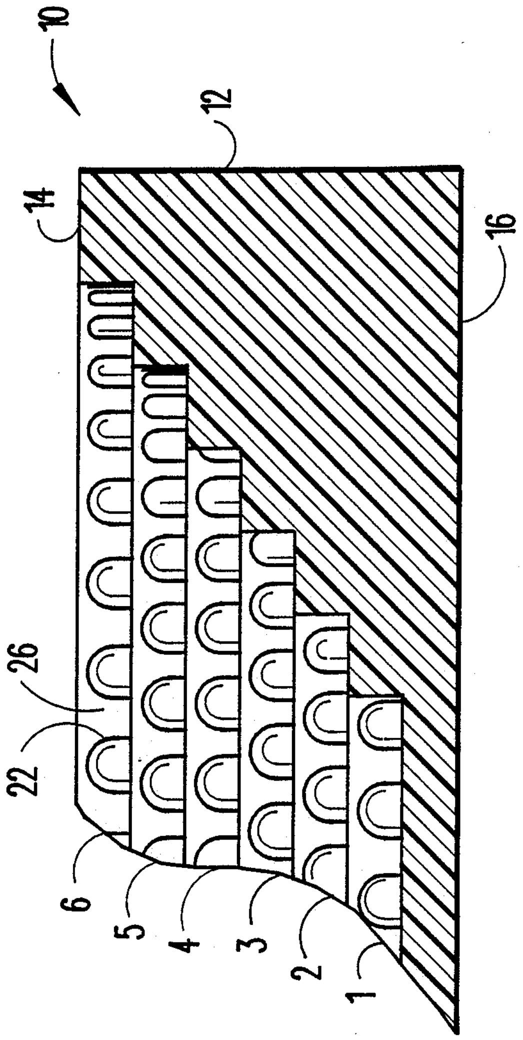
FIG. 4 is a partial cross sectional view, taken along line 4 of FIG. 3.

As shown in the cross sectional view of FIG. 4, shade zones 22 on the cylindrical vertical step surfaces are preferably formed with an arcuate ended curvature to simulate an individual's fingernail. The surfaces 22 may comprise decals affixed to the cylindrically curved vertical surfaCe. Alternatively, the surfaces 22 may be formed as slight indentations into the vertical surface to receive a painted nail polish sample. Finally, the surfaces 22 may include arcuately curved projecting surfaces to simulate an actual nail. In this case, the arcuate surfaces may be integrally molded or adhesively secured.

Figure 5:
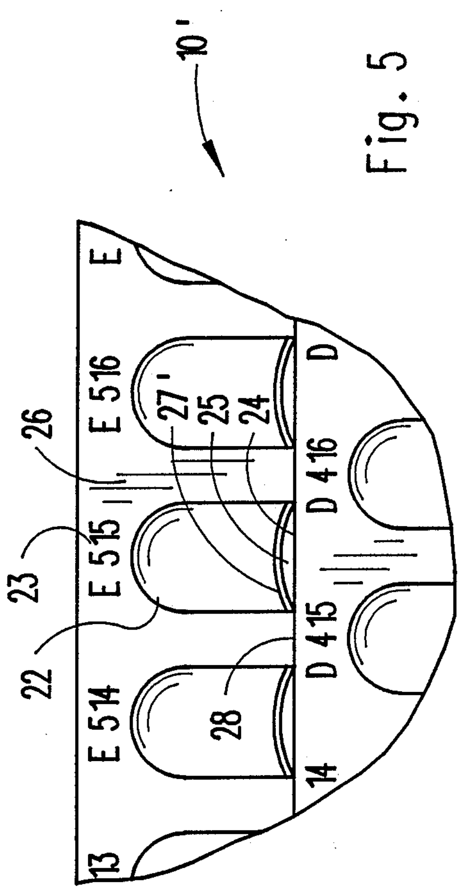
FIG. 5 is an enlarged detail view illustrating the vertical step surfaces of a nail polish display stand according to a slightly modified embodiment of the invention.

FIG. 5 illustrates an enlarged partial detail view of the vertical step surfaces of a nail polish display stand according to a slightly modified embodiment 10' of the invention. The vertical step surfaces include a plurality of spaced zones 22 which may bear a decal or a painted portion of a particular nail polish shade. Indicia 23 is provided on the vertical wall surface, adjacent each of the zones 22, which serves as an identifying reference for obtaining a container of the desired nail polish. A plurality of spaced arcuate mounting surfaces 25 are provided in the horizontal surface display zones 24. An artificial fingernail 27' is adhesively secured on each of the mounting surface 25, and is painted with the associated nail polish shade. Alternatively, the artificial fingernail 27' may be omitted, and the nail polish sample shade painted directly on the arcuate surface 25.

Figure 6A:
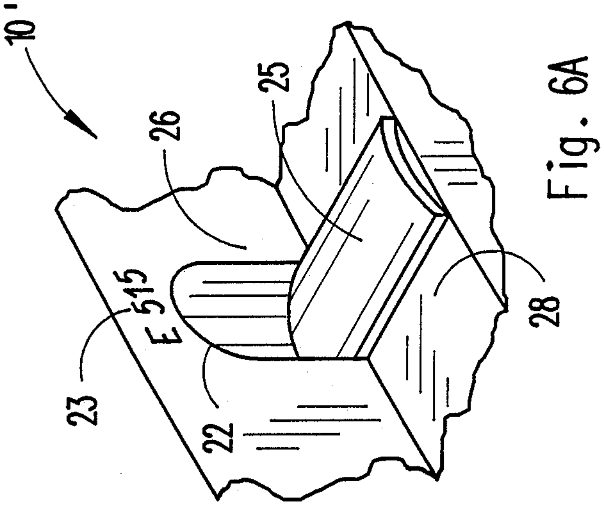
FIG. 6A is an enlarged partial perspective detail view illustrating intersecting horizontal and vertical step surfaces of the nail polish display stand according to the second embodiment of the present invention.
Figure 6:
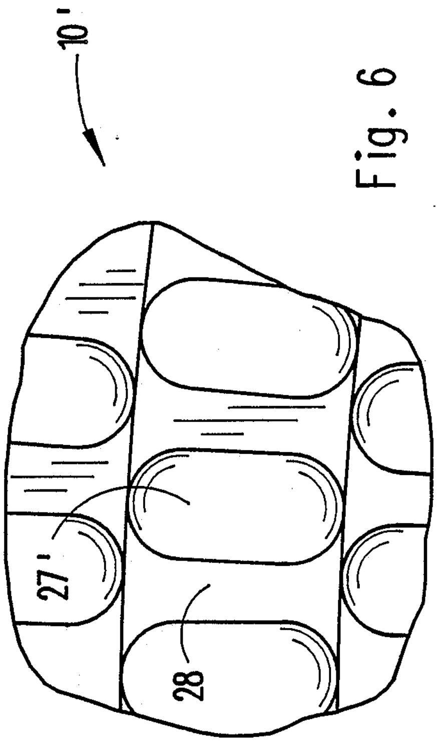
FIG. 6 is an enlarged detail view illustrating horizontal step surfaces according to the modified second embodiment of the present invention.

FIG. 6 provides a detail view illustrating the horizontal step surfaces and the artificial nails 27'.

FIG. 6A is a partial perspective view illustrating the arcuate mounting surface 25 disposed on the horizontal step surface, with the artificial fingernail removed therefrom. As previously described, the nail polish color shade sample may be applied by painting directly to the upper arcuate surface of the projection 25.

Figure 7:
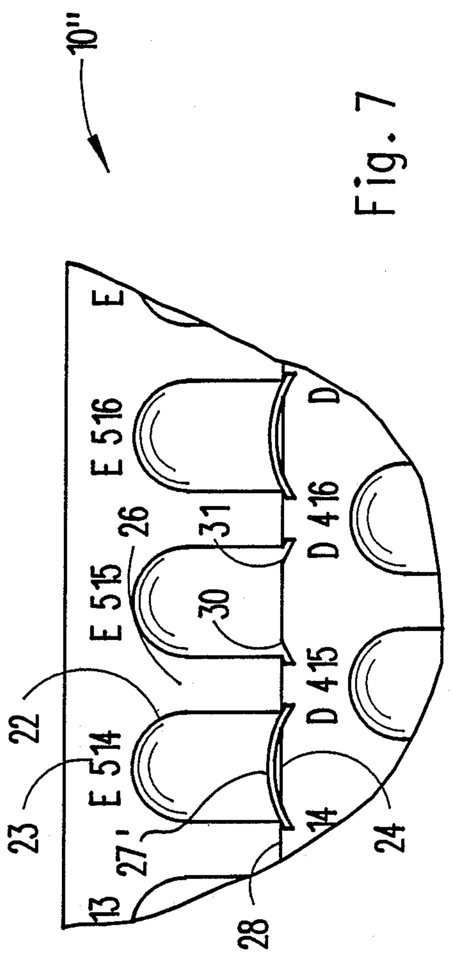
FIG. 7 is an enlarged detail view illustrating the vertical step surfaces of a nail polish display stand according to a third embodiment of the present invention.

FIG. 7 is an enlarged detail view illustrating the vertical step surfaces of a third embodiment 10″ which allows the use of removable artificial nails 27'. A pair of oblique oppositely extending slots 30 and 31 are provided at the boundary of each of the horizontal zones 24. The slots 30 and 31 are dimensioned and spaced to receive opposite side edges of the artificial nail 27', while maintaining the artificial nail in a slightly flexed position to provide a natural curvature. As may now be understood, the artificial nail 27' may be easily removed and replaced within the slots 30 and 31, to selectively vary the nail polish shades displayed. Alternatively, the nail polish shades may be permanently displayed by adhesively securing the artificial nails 27' within the slots 30 and 31.

Figure 8:
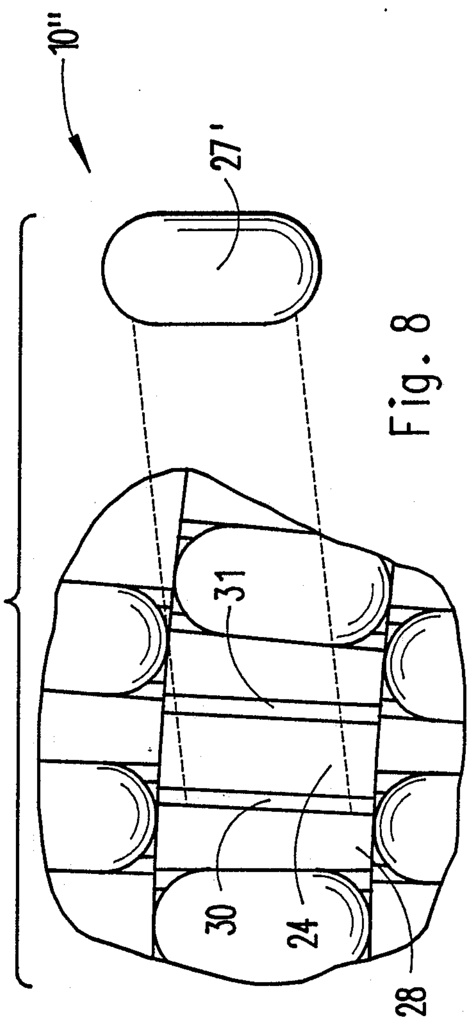
FIG. 8 is an enlarged detail view illustrating the manner of mounting an artificial nail and aligned slots on the horizontal surface of the nail polish display stand according to the third embodiment of the present invention.

FIG. 8 provides an enlarged partial detail view which illustrates the horizontal step surfaces. The nail 27' is illustrated removed from the slots 30 and 31 disposed on opposite sides of the shade display zone 24.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A nail polish color display stand, comprising:

a cylindrical housing having an open top end and a hollow interior defined by an interior side wall and an interior floor;

a plurality of sequential, vertically spaced steps formed in said interior side wall, said steps forming perpendicularly intersecting horizontal annular and vertical cylindrical surfaces, said horizontal and vertical surfaces increasing in diameter from said interior floor to said top end;

a plurality of various different shades of nail polish color samples displayed in circumferentially spaced relation on one of each of said horizontal surfaces or each of said vertical surfaces; and associated identifying indicia for each of said color samples disposed adjacent each of said color samples on the other of each of said horizontal surfaces or each of said vertical surfaces.

2. The nail polish color display stand of claim 1, wherein said color samples are disposed on said vertical surfaces and associated identifying indicia for each sample are disposed on an adjacent horizontal surface.

3. The nail polish color display stand of claim 1, wherein said color samples are disposed on said horizontal surfaces and associated identifying indicia for each sample are disposed on an adjacent vertical surface.

4. The nail polish color display stand of claim 1, wherein said color samples are displayed on artificial nails secured on said steps.

5. The nail polish color display stand of claim 4, further comprising a plurality of arcuate mounting surfaces on said steps for supporting said nails.

6. The nail polish color display stand of claim 4, further comprising a plurality of pairs of spaced slots on said steps for securing said nails.

7. A nail polish color display stand, comprising:

a cylindrical housing having an open top end and a hollow interior defined by an interior side wall and an interior floor;

a plurality of sequential, vertically spaced steps formed in said interior side wall, said steps forming perpendicularly intersecting horizontal annular and vertical cylindrical surfaces, said horizontal and vertical surfaces increasing in diameter from said interior floor to said top end;

a plurality of various different shades of nail polish color samples displayed in circumferentially spaced relation on one of each of said horizontal surfaces or each of said vertical surfaces;

said color samples displayed on artificial nails secured to a plurality of arcuate mounting surfaces on said steps; and associated identifying indicia for each of said color samples disposed adjacent each of said color samples on the other of each of said horizontal surfaces or each of said vertical surfaces.

8. A nail polish color display stand, comprising:

a housing having an open top end and a hollow interior defined by an interior side wall and an interior floor;

a plurality of sequential, vertically spaced steps formed in said interior side wall, said steps forming perpendicularly intersecting horizontal and vertical surfaces, said horizontal and vertical surfaces increasing in diameter from said interior floor to said top end;

a plurality of various different shades of nail polish color samples displayed in spaced relation on one of each of said horizontal surfaces or each of said vertical surfaces; and associated identifying indicia for each of said color samples disposed adjacent each of said color samples on the other of each of said horizontal surfaces or each of said vertical surfaces.

9. The nail polish color display stand of claim 8, wherein said color samples are disposed on said vertical surfaces and associated identifying indicia for each sample are disposed on an adjacent horizontal surface.

10. The nail polish color display stand of claim 8, wherein said color samples are disposed on said horizontal surfaces and associated identifying indicia for each sample are disposed on an adjacent vertical surface.

11. The nail polish color display stand of claim 8, wherein said color samples are displayed on artificial nails secured on said steps.

12. The nail polish color display stand of claim 11, further comprising a plurality of arcuate mounting surfaces on said steps fur supporting said nails.

13. The nail polish color display stand of claim 11, further comprising a plurality of pairs of spaced slots on said steps for securing said nails.

* * * * *